(12) United States Patent
Makhmudov et al.

(10) Patent No.: US 8,467,514 B1
(45) Date of Patent: Jun. 18, 2013

(54) CROSS-PLATFORM PRESENCE

(75) Inventors: Yakov Makhmudov, South San Francisco, CA (US); Igor Roussinov, San Jose, CA (US); Curt T. Larson, San Francisco, CA (US); Vlad Vendrow, Redwood Shores, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/442,488

(22) Filed: Apr. 9, 2012

(51) Int. Cl.
*H04M 3/42* (2006.01)

(52) U.S. Cl.
USPC ............... 379/201.1; 379/201.07; 379/207.04

(58) Field of Classification Search
USPC ........ 379/32.01, 32.04, 93.07, 93.17, 100.05, 379/100.06, 201.01, 201.02, 201.04, 206.01, 379/207.04, 207.12, 207.14, 212.01, 201.07, 379/201.1, 207.02, 216.01, 211.01; 455/414.1, 455/417
See application file for complete search history.

(56) References Cited

U.S. PATENT DOCUMENTS

| | | | |
|---|---|---|---|
| 4,734,928 A | 3/1988 | Weiner et al. | |
| 6,442,404 B1 | 8/2002 | Sakajiri | |
| 6,545,697 B1 | 4/2003 | Parker et al. | |
| 6,647,107 B1 | 11/2003 | Horrer | |
| 6,671,366 B1 | 12/2003 | Isotalo | |
| 6,889,045 B2 | 5/2005 | Pan et al. | |
| 6,967,947 B1 | 11/2005 | Chen et al. | |
| 7,139,797 B1 * | 11/2006 | Yoakum et al. | 709/204 |
| 7,167,710 B2 | 1/2007 | Thakkar et al. | |
| 7,245,913 B1 | 7/2007 | Nguyen et al. | |
| 7,308,255 B2 | 12/2007 | Loveland | |
| 7,822,186 B1 | 10/2010 | Boni | |
| 8,098,810 B2 | 1/2012 | Lyman | |
| 8,121,592 B2 | 2/2012 | Hayakawa | |
| 8,125,931 B2 * | 2/2012 | Faber et al. | 370/259 |
| 2002/0067714 A1 | 6/2002 | Crain et al. | |
| 2003/0186686 A1 | 10/2003 | Yang et al. | |
| 2004/0062383 A1 * | 4/2004 | Sylvain | 379/265.06 |
| 2004/0122901 A1 * | 6/2004 | Sylvain | 709/206 |
| 2004/0204038 A1 | 10/2004 | Suzuki et al. | |
| 2005/0047373 A1 | 3/2005 | Kojima | |
| 2005/0190747 A1 | 9/2005 | Sindhwani et al. | |

(Continued)

FOREIGN PATENT DOCUMENTS

| | | |
|---|---|---|
| EP | 1 453 283 A1 | 9/2004 |
| EP | 2 166 733 A1 | 3/2010 |
| KR | 10-2005-0014088 | 2/2005 |
| KR | 10-2008-0029682 | 4/2008 |

OTHER PUBLICATIONS

U.S. Appl. No. 13/229,355, filed Sep. 9, 2011, Mobile Devices Having a Common Communication Mode, Shmunis et al.

(Continued)

*Primary Examiner* — Binh Tieu
(74) *Attorney, Agent, or Firm* — Fish & Richardson P.C.

(57) ABSTRACT

Systems, methods, and computer program products for providing cross-platform presence are described. In some implementations, a cross-platform presence server can be provided that allows a caller to accurately assess the availability and other similar status of a callee by evaluating a device status of a plurality of communication devices associated with the callee. The cross-platform presence server can then determine, based on these device statuses, whether a callee is available. The availability of the callee can subsequently be displayed to the caller (e.g., on the caller's phone), or any other individuals who have been granted permission by the callee to be notified of the callee's availability.

20 Claims, 6 Drawing Sheets

U.S. PATENT DOCUMENTS

| | | | |
|---|---|---|---|
| 2006/0045056 | A1 | 3/2006 | O'Hara, Jr. |
| 2006/0126806 | A1 | 6/2006 | Trandal et al. |
| 2006/0140200 | A1 | 6/2006 | Black et al. |
| 2007/0047519 | A1 | 3/2007 | Bangor et al. |
| 2007/0058637 | A1 | 3/2007 | Lo |
| 2007/0070976 | A1 | 3/2007 | Mussman et al. |
| 2007/0105531 | A1 | 5/2007 | Schroeder |
| 2007/0149182 | A1 | 6/2007 | Muratore et al. |
| 2007/0153771 | A1 | 7/2007 | Doradla et al. |
| 2007/0153986 | A1 | 7/2007 | Bloebaum |
| 2007/0217591 | A1* | 9/2007 | Yasuma .................. 379/202.01 |
| 2007/0233875 | A1 | 10/2007 | Raghav et al. |
| 2007/0253545 | A1 | 11/2007 | Chatterjee et al. |
| 2008/0046580 | A1 | 2/2008 | Lafuente et al. |
| 2008/0153554 | A1 | 6/2008 | Yoon et al. |
| 2008/0247530 | A1* | 10/2008 | Barton et al. ............ 379/216.01 |
| 2008/0267371 | A1* | 10/2008 | Shibata ..................... 379/93.17 |
| 2009/0022103 | A1 | 1/2009 | Shatsky |
| 2009/0112996 | A1 | 4/2009 | Baker, III et al. |
| 2009/0116466 | A1 | 5/2009 | Lee et al. |
| 2009/0310598 | A1 | 12/2009 | Winbladh |
| 2010/0035594 | A1 | 2/2010 | Vendrow et al. |
| 2010/0046731 | A1* | 2/2010 | Gisby et al. ............. 379/211.01 |
| 2010/0297986 | A1* | 11/2010 | Cermak et al. ............ 455/414.1 |
| 2011/0244878 | A1* | 10/2011 | Kochetkov et al. ........ 455/456.1 |
| 2011/0281549 | A1 | 11/2011 | Bajpai et al. |

OTHER PUBLICATIONS

International Preliminary Report on Patentability from International Application No. PCT/US2009/051598, dated Feb. 17, 2011, 8 pages.

International Search Report and Written Opinion in Application No. PCT/US2009/051598, dated Mar. 9, 2010, 14 pages.

RingCentral® User Guide, RingCentral Online, http://www.ringcentral.com, San Mateo, CA, Jan. 7, 2007, 32 pp.

U.S. Appl. No. 13/224,741, filed Sep. 2, 2011, Unified Caller Identification Across Multiple Communication Modes, Shmunis, et al.

U.S. Appl. No. 13/454,879, filed Apr. 24, 2012, Unified Caller Identification Across Multiple Communication Modes, Shmunis, et al.

EPO Communication from EP Application No. 09805350.7 dated Jan. 23, 2013, 6 pages.

EPO Search Report from EP Application No. 09805350.7 dated Jan. 10, 2013, 4 pages.

"3rd Generation Partnership Project; Technical Specification Group Core Network and Terminals; Combining CS calls and IMS sessions; Stage 3 (Release 7)", 3GPP Standard; 3GPP TR 24.879, 3rd Generation Partnership Project (3GPP), Mobile Competence Centre; 650, Route des Lucioles; F-06291, No. V7.0.0.0, Mar. 1, 2006, pp. 1-73.

International Search Report and Written Opinion from International Application No. PCT/US2012/032781, mailed Jan. 3, 2013, 13 pages.

Sparks, R., "Simple Presence Document Usage Examples; draft-sparks-simple-pdoc-usage-oo.txt", dynamicsoft, Oct. 17, 2003, 27 pages.

Vasala, K., "Enabling Network Based Presence Aggregation using IMS", IP Multimedia Subsystem Architecture and Applications, 2007 Internatioal Conference on, IEEE, Piscataway, New Jersey, USA, Dec. 6, 2007, pp. 1-5.

* cited by examiner

CROSS-PLATFORM PRESENCE

TECHNICAL FIELD

The subject matter of this application is generally related to communications systems.

BACKGROUND

In a communication system suitable for voice calls, a callee's presence (or status) can typically be known by the caller after a voice call is made. For example, if the dial-tone is busy, the callee is on the phone. A caller may also determine the presence of a callee by monitoring the callee's busy lamp. For example, if the callee's busy lamp signals red, the callee is likely to be on the phone and therefore not available to take an incoming call.

A voice call can be made by a variety of communication devices. Example communication devices may include desk phones, cellular phones, softphones, and smartphones. Different communication devices can use different communication services for communications. For example, a desk phone may use a fixed-line phone service to communicate through a public switched telephone network (PSTN), a cell phone or a smartphone may use a mobile telephony service to communicate through a cellular network, and a softphone may use a broadband service to communicate though a broadband network. In some cases, a voice service user may use more than one communication device. Since the communication services used by different communication devices are often distributed rather than centralized, a unified presence of the voice service user may not be available to other users in the communication system.

SUMMARY

A plurality of communication devices associated with a user profile are identified by a service provider, where the user profile is associated with a subscriber subscribing to telecommunication services provided by the service provider. The service provider monitors inbound and outbound communications for each of the plurality of communication devices, and determines a device status associated with each of the plurality of communication devices based in part on the monitored inbound and outbound communications. A user availability of the subscriber is determined by the service provider, based on an aggregate of the device statuses associated with the plurality of communication devices, and the user availability on one or more receiving devices is displayed.

DESCRIPTION OF DRAWINGS

Like reference symbols in the various drawings indicate like elements.

Figure 1:
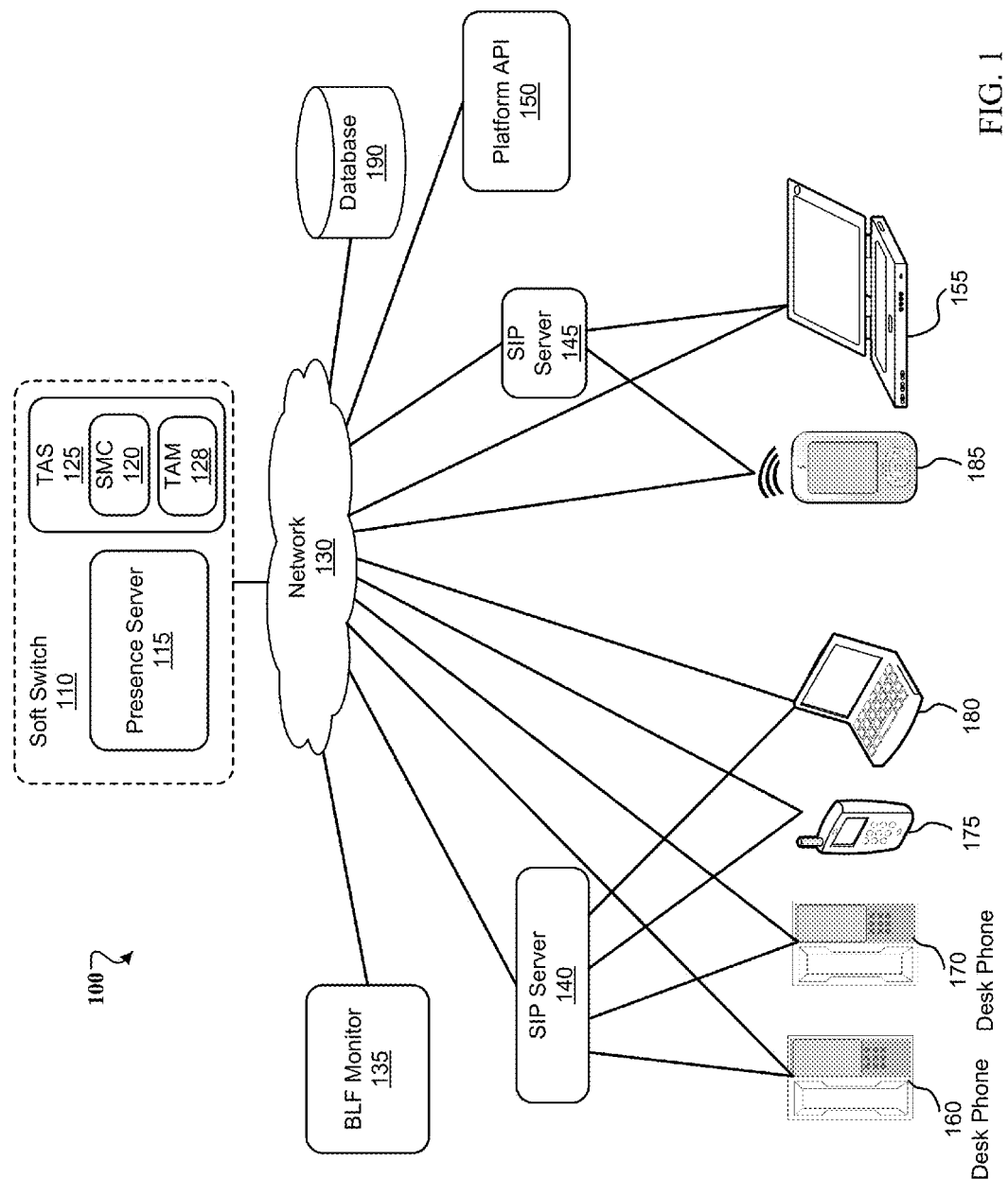
FIG. 1 illustrates an example system that provides a cross-platform presence server.

Also, all materials and screenshots as described herein are protected by United States copyright law and may not be reproduced, distributed, transmitted, displayed, published or broadcast without the prior written permission of the assignee of record.

DETAILED DESCRIPTION

Systems, methods, and computer program products for providing cross-platform presence are described. In some implementations, a cross-platform presence server can be provided that allows a caller to accurately assess the availability and/or status of a callee by evaluating a device status of one or more communication devices associated with the callee. The cross-platform presence server can then determine, based on these device statuses, whether a callee is available. The availability of the callee can subsequently be displayed on various devices (e.g., on the caller's desk phone, mobile phone, tablet, computer, etc.) of individuals who have been granted permission by the callee to be notified of the callee's availability (e.g., secretary, co-worker, colleague, supervisor, caller, etc.).

Generally, the call state of a callee can be used to determine whether a call should be transferred to the callee. For example, when a secretary of a manager considers whether to call or transfer a call to the manager in a business environment, it is useful for the secretary to understand the call state of the manager. Example call states include "on the phone," "phone is ringing," "do not disturb," "unavailable," "busy," "out of office," "away from desk," "at home," "mobile," "traveling," and other similar statuses. In some cases, the secretary services an incoming call by reading a busy lamp field (BLF) on the secretary's telephone corresponding to the manager's phone line that indicates whether the manager's phone line is in use. For example, a blinking red light on the manager's BLF may indicate that the manager's phone line is in use, which means that the manager is likely "busy." Similarly, a green light on the manager's BLF may indicate that the manager's phone line is not occupied and the manager is likely "available." In another example, a yellow light on the manger's BLF may indicate that the manager is not near the manager's desk phone (e.g., as determined by manager's mobile device GPS, IP address, or WiFi network location) but the manager is available through the manager's mobile device (e.g., as determined by state of applications running on the manager's mobile device), indicating that the manager is "out of office" or "away from desk" but available over the manager's mobile device.

A call state associated with a particular communication device of the callee does not always represent the actual availability or "presence" of the callee. For example, a constant green light that indicates a callee's desk phone is not in use does not necessarily mean that the callee is available to talk, since the callee can be communicating on another device (e.g., texting, instant messaging, or calling on a mobile phone). Therefore, understanding the communication states of the callee's various communication devices is useful to decide how to communicate with a callee.

The detection of a unified cross-platform presence across various communication devices of a callee allows incoming calls to be serviced more expeditiously and efficiently. For example, the unified cross-platform presence as described herein allows office workers to identify the availability of other office workers without having to call, walk to, or instant message the co-workers to be contacted. As another example, the unified cross-platform presence as described herein reduces hold time and hang-ups by customers by quickly routing customer-related calls to an available representative, which facilitates a shorter hold time for customers while allowing lesser customer-related calls to be transferred to representatives who are unavailable to service such calls. As yet another example, the unified cross-platform presence as described herein increases executives' productivity by having administrators (e.g., secretaries or office managers) service all calls to the executives with a more accurate knowledge of the executives' availability.

System Overview

As will be described in greater detail below with respect to FIG. 1, a business telephony system 100 can be used to provide cross-platform presence and associated information. The business telephony system 100 can include, without limitation, a database that can store registration information of users of the business telephony system, subscriber/user extension information associated with each user, user security/authorization information, rules for calculating and presenting business presence, and other information associated with providing cross-platform presence. The business telephony system 100 can also include a telephone access server (TAS) responsible for tracking status of calls across different platforms of the system, one or more session initiation protocol (SIP) servers for routing calls from communication devices, and a presence server that can convert protocols across different platforms and calculate a unified presence of a system user based on the status obtained from other components of the system. The business telephony system 100 can include other components for the purpose of providing cross-platform presence.

An example process of obtaining cross-platform user statuses is described by way of the following example. When a user picks up a desk phone whose number, for example, is registered to the business telephony system 100 to make a call, the call can be directly forwarded to the business telephony system. The business telephony system 100 can route the call to the intended callee, associate the calling device to the caller, and start tracking and updating status of both the caller and the callee. For example, the business telephony system 100 can automatically update the status of the caller associated with the "desk phone" as "busy" as soon as the desk phone is in use, even if other communication devices associated with the caller are available for use. Further, as will be described in greater detail below, the presence update of the caller can be automatically forwarded to and displayed on communication devices of other users who are permitted to monitor the status of the caller.

Communication devices that can be registered and tracked by the business telephony system 100 can include, without limitation, any communication device such as a desk phone, cellular phone, smartphone, softphone, laptop, or any associated applications or services, including for example, communications, scheduling, or calendar applications. The device statuses of all communication devices associated with a registered user can be stored in a database included in or communicably coupled to the business telephony system 100. To determine a presence of a user, the business telephony system 100 can first gather all the status information associated with the user's communication devices (e.g., retrieve the status information from the database). Where the statuses across the various communication devices are different from each other, the business telephony system 100 can calculate a cross-platform status based on a set of rules that define a hierarchy of the statuses (and priorities). The priority of a status in the hierarchy can be based on the importance of the status. A status that is higher in the hierarchy can override a status that is lower in the hierarchy. For example, the status "do not disturb" can override the status "busy" or "away from desk." As another example, the status "busy" can override the status "available." For example, when a user's status is "do not disturb" on one communication device and "available" on another communication device, the cross-platform presence of the user can be shown as "do not disturb."

In some implementations, the business telephony system 100 can also gather status information from applications or services associated with the user, including for example, a user's communications accounts, social media accounts, calendar accounts, or messaging accounts. The business telephony system 100 can present the user with an option to share status from those applications or services, and the user can provide login information and credentials to the business telephony system 100 so it can gather status information from those applications or services. The user can then specify the priority of the status information from the applications, services, and communications devices.

Besides determining cross-platform presence of a user based on the priority of call statuses, in some implementations, the cross-platform presence may also be determined based on one or more characteristics of the call on different communication devices associated with the user. The one or more characteristics can include the importance of the call. For example, a call placed on an office desk phone (for business uses) can be set to have a higher priority than a call placed on a cell phone (for personal uses). In this example, when a user is "busy" on a cell phone, the cell phone call may be interrupted if there is a call to the desk phone. In another example, the determination of whether the call may be interrupted may be based on the identity of the individual communicating with the user (e.g., personal calls may be interrupted while business calls may not) or the user's mode of communication (e.g., instant messaging may be interrupted while telephone calls may not). In some implementations, the same call status can be categorized into different sub-statuses for different communication devices. For example, when a service user is calling on an office desk phone, the status of the user may be identified as "busy (do not interrupt)." When the service user is calling on a personal cell phone, the status of the user may be identified as "busy (can interrupt)." In some implementations, the "busy (do not interrupt)" status can override the "busy (can interrupt)" status. Furthermore, the different sub-statuses may be identified based on different BLF presences on the respective communication devices. For example, a smartphone with a rich display can show the status "busy (do not interrupt)" on a BLF as red, and show the status "busy (can interrupt)" as yellow. Alternatively, the smartphone can directly show that another user is on a business call or a personal call.

In some implementations, the communication device user can customize the rules for calculating and/or displaying his/her cross-platform status. For example, a user may have a personal cell phone registered to a cross-platform presence server 155. However, the user may not want the status of the cell phone to override any of the statuses of other communication devices associated with the user. In such case, the user can define a rule that restricts the personal cell phone from reporting status to the presence server 155 or automatically set the statuses of the personal cell phone with the lowest priority. In some implementations, the user can define the set of devices, as well as applications or services, from which the user's cross-platform presence may be calculated. For example, the user may select an office phone, mobile phone, softphone or other device or application (e.g., Microsoft Outlook® account), from which the user's cross-platform presence may be calculated. The user may also define priorities and rules between those devices and applications for calculating cross-platform presence (e.g., Microsoft Outlook® calendar availability overrides device availability, or softphone activity results in "busy (can interrupt)" status).

In some implementations, the cross-platform presence of a service user can be manually set by the service user through the use of an application programming interface (API). In some implementations, a status manually set by a service user can have the highest priority and override any other call statuses. For example, even if a user is free of use of any of his/her communication devices, if the user manually set his presence as "do not disturb," his/her cross-platform presence can be shown as "do not disturb." In another example, the API may be used by authorized individuals to retrieve the user's cross-platform presence in addition to setting the user's cross-platform presence.

In some implementations, the cross-platform presence information may include metadata (including more detailed status information) which may be available to different service users based on their respective privileges. When a general/default cross-platform presence information of a user is shown to a caller, the caller may request the presence server 115 for more detailed status information regarding the user's presence. The presence server 115 may send status information with a granularity level based on the privileges of the requestor. For example, if the cross-platform presence of a user is shown as "busy" to a caller, the caller may request the presence server 115 for more detailed information with respect to this status. If the caller can be authenticated by the presence server 115, the presence server 115 may send more detailed information to indicate that the user is "in a meeting" or "on a business trip." In some implementations, the presence server 115 can also automatically authenticate the caller and directly provide the caller with cross-platform presence information with a corresponding granularity.

As described above, the cross-platform status can be calculated for a service user in various ways. In some implementations, the cross-platform status can be calculated for a group of users who are registered to the service (e.g., corporate department). For example, a customer service department of a company can have a group of customer service representatives (CSRs). The CSRs may be placed in a queue to provide customer services to customers based on a time order. When a customer calls in to reach a customer service representative, the system or corporate receptionist can use the cross-platform availability of the customer service department to determine whether the customer can be immediately served. In this example, as long as at least one CSR is available, the cross-platform presence of the customer service department can be shown as available, instead of exposing the availability of the individual CSRs. In some implementations, the members of a group from which cross-platform presence may be calculated may be set by an administrator.

Table 1 shows a list of example functions that can be provided using cross platform presence information.

TABLE 1

| Function | Example description of function |
| --- | --- |
| Colleague presence viewing | When a system user's colleagues are available as indicated by presences, the user can know when to call them or walk to their desk. The user can select which colleagues to monitor and see their names on the extra line keys he/she assigns to them. The user can expect to see no light if his/her colleagues are available, red if they are on the phone, blinking green if they have an incoming call, yellow if they have a call on hold. The colors may vary by phone model. Presence can include user status on any device - digital line, forwarded call, softphone call, etc. |
| Colleague transfer to voicemail | A system user is able to transfer a caller to a colleague's voicemail when the presence of the colleague is shown as "unavailable." For example, the user can press *0, followed by an extension, and have a blind transfer initiated directly to the voicemail greeting of the colleague's extension. In case of invalid extension or shared group extension, an error message can be generated. |
| Receptionist status viewing | A receptionist can view multiple employee presences at a glance. The receptionist can tell callers if they're available and transfer calls to them. The receptionist can add a sidecar to a desk phone. He/she can expect to see the same red/red blinking/orange lights on the sidecar. Presence can include employee status on any device - digital line, forwarded call, softphone call, etc. |
| Admin call pickup | An admin can pick up calls made to his/her boss' line. If the admin picks up his/her phone or otherwise initiates a call without selecting a line key, even if a monitored line is ringing, the admin can get a dial tone on his/her own line. However if the admin presses a ringing line key, and is granted the permission to pick up, he/she can pick up the selected line key. If the admin is not granted pick up permission then the action of picking up can initiate a call to the monitored user. If a monitored line is on-hold, the admin can also pick it up by pressing the line key. If the monitored line is off-hook, the admin cannot pick it up. |
| Colleague view configuration | An office worker can select the employees he/she wants to see the presences of. The office worker can assign the employees to the extra line keys on his/her phone and/or sidecar. He/she can see which employees are assigned to which corresponding keys. The system can know how many line keys the office worker has, including installed sidecars, and display them in a logical fashion. The office worker does not need to set up the presence view separately for each phone, |

TABLE 1-continued

| Function | Example description of function |
|---|---|
| | softphone, smartphone, etc. A universal user interface can be used for all his/her communication devices. |
| Status monitor permission | A system user can turn off the ability for other users to see his/her status/presence by default. |
| Line availability | A system user can reserve a number of lines on his/her phone for his/her own calls, so there is no confusion. The reserved lines cannot be assigned to monitor his/her colleagues |
| Assisted Provisioning | The BLF can work the same for communication devices purchased from different vendors using assisted provisioning. |
| Monitoring Multiple Simultaneous Calls | An admin can monitor multiple simultaneous calls made to his/her boss's line. The admin can initially see a busy indicator if his/her boss is on call on Line 1. When his/her boss receives a second call, the indicator can turn to an incoming (ringing) call indicator to indicate incoming call on Line 2. If the admin picks up the call then the indicator can turn back to indicate that Line 1 is "busy." |

Referring to FIG. 1, an example business telephony system 100 is shown. The example system 100 can be a service provider that offers various communications-related services to subscribers. Such users can include individuals or employees within a company, organization, or other business entities. Example users can also include administrators, receptionists, and office users.

As shown, the example system 100 can include a presence server 115, a signaling media control (SMC) 120, a TAS 125, a telephony answering machine (TAM) 128, a network 130, a busy lamp field (BLF) monitor 135, SIP servers 140, 145, a platform API 150, a computer 155, a database 190, and one or more communication devices. The communication devices operating in the example system 100 can include, for example, desk phones 160, 170, cell phones 175, softphones 180, and smartphones 185. The presence server 115, SMC 120, TAS 125, and TAM 128 are communicably coupled to each other and included in a soft switch 110 of the example system 110.

The presence server 115 can collaborate with one or more other components of the soft switch 110, such as the TAS 120, to monitor connections and communications across one or more communication devices. Also, the presence server 115 can determine a presence of a user based on tracking types of the subscribers and subscriber devices provided by other soft switch 110 components. Although shown as one presence server 115 in FIG. 1, the soft switch 110 also can include more than one presence server 115 for scalability purposes. Further, the presence server 115 can monitor presences of more than one user who is subscribed to the example system 100. Each presence server 115 can be responsible for managing presence for at least a portion of the users operating in the example system 100. The presence server 115 can also grant permissions to user extensions to use cross-platform services provided by the example system 100.

The soft switch 110 can include call processing logic that can monitor user status across different platforms (e.g., voicemail, email, MMS, SMS, other platform-based communications, communications applications, social networking applications, or scheduling applications). For example, the presence server 115 can be configured by default to operate with SIP protocol communication devices. Traditional analog communication devices can still be monitored, such as when using an adapter that can translate information across different platforms at the presence server 115. The soft switch 110 can perform a variety of functionalities. For example, the soft switch 110 can hold calls, decide how to route calls, when to play a greeting, when to connect a call, when to ring, when to hang up, or to perform any other call-related logic.

Similarly, the TAS 125 can keep track of the status of calls made by the subscribers of the example system. The TAS 125 can also associate calling status of a subscriber to a user extension based on a user/subscriber information list stored in the database.

The TAS 120 can include an SMC 120 and a TAM 128. The TAM 128 can update the presence server 115 with respect to the state of calls. The communication between the TAM 128 and the presence server 115 can be based on an active telephony control protocol (TCP) connection. For any of the communication devices (e.g., service subscribers), when there is a status change, or an activity performed (e.g., a number is being dialed, or a call is made or terminated by a subscriber), the updates can be cached in a database 190. In some implementations, a system snapshot regarding the latest statuses of communication devices can be taken periodically or based on a system update. The TAM 128 can stream information associated with the system snapshot to one or more presence servers 115 in parallel to maintain load balancing across different presence servers 115. Each presence server 115 can parse the information received and determine status information that relates to an extension of the example system 100 associated with the presence server 115. Each presence server 115 can include subscriber information of the entire example system 100. In some implementations, each presence server 115 can store status updates for a subset of subscribers associated with that particular presence server 115.

The SMC 120 can interact with media on the Internet through a media server (not shown), in order to allocate media resources. The SMC 120 can also function to bridge calls across subscribers operating on different protocols based on a business logic associated with the presence server 115.

As discussed above, information associated with providing user presences can be stored in a database 190. Such information can include, for example, business level call forwarding logic, service tasks, a set of rules for determining user presence, user classes and call status classes, billing capabilities, and other information associated with the calls. Further, the database 190 can store registry information of the users/subscribers. Information stored in the database 190 can be used to provide a database centric solution for providing cross-platform user presence.

The database 190 can include any memory or database module and may take the form of volatile or non-volatile memory including, without limitation, magnetic media, optical media, random access memory (RAM), read-only memory (ROM), removable media, or any other suitable local or remote memory component. Database 190 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the example system 100. Additionally, the database 190 can include any other appropriate data, such as VPN applications, firmware logs and policies, firewall policies, a security or access log, print or other reporting files, as well as others.

Although shown as one BLF monitor 135 in FIG. 1, the example system 100 can include more than one BLF monitor 135. At least one BLF monitor 135 can be associated with a user and/or a communication device. The BLF monitor 135 can provide presence information to the user based on preferences of the user and/or permission for monitoring presences from other users. One or more BLF monitors 135 can be associated with a presence server 115 based on load balancing within the example system 100. The BLF monitor 135 can monitor the state of calls and subscribers associated with the calls. In some implementations, the BLF monitor 135 is associated with a web user interface (UI). In some implementations, a BLF agent can also forward subscribed messages monitored on the BLF monitor 135 from subscribers to its associated presence server 115. For example, the BLF agent can forward information regarding which subscribers are on a call to its associated presence server 115.

The SIP servers (or SIP proxies) 140, 145 can operate with subscribers using a SIP protocol. SIP is an Internet Engineering Task Force (IETF)-defined signaling protocol used for controlling communication sessions such as voice and video calls over Internet Protocol (IP). The SIP protocol can be used for creating, modifying and terminating two-party (unicast) or multiparty (multicast) sessions. Sessions can include one or several media streams. The SIP server can also operate with the SMC 120 to locate user associated media resources on the Internet.

The SIP servers 140, 145 can initiate or break down a call, understand subscribed messages sent from subscribers, and send the subscribed messages to the presence server 115. The SIP servers 140, 145 can also work as load balancers of the example system 100.

The SIP servers 140, 145 can connect to different types of devices over IP to the soft switch 110. For example, the SIP server 140 can connect subscribers including IP enabled desk phones 160, 170, cell phone 175, and softphone 180. The SIP server 145 can connect to a smartphone and a computer (e.g., Mac computer or PC). In addition to the digital communication devices as described above, the SIP server 140 can also connect to analog devices. For example, at least one of the desk phones 160, 170 can be a traditional analog phone. The SIP server can forward calls from analog phones to digital communication devices in the example system 100. In some implementations, communication devices, such as desk phones 160, 170, cell phones 175, softphones 180, smartphones 185 and computers 155 can directly communicate with the soft switch 110 though the network 130. For example, desk phones 160, 170 with Internet Protocol (IP) capabilities, smartphones 180 and/or softphones 180 can directly connect though the Internet to the presence server 115 without going through the SIP servers 140, 145. In some implementations, the presence of the communication devices that communicate directly with the soft switch 110 though the network 130 can be determined based on using cross-platform presence applications. For example, a smartphone 185 user can indicate his/her current status by using a cross-platform presence application to send out a text message directly to the presence server.

The SIP servers 140, 145 can be communicably coupled to the soft switch 110 through the network 130, such that the presence server 115 can be aware of the connections across different types of communication devices. For example, when a user is traveling in his car, and is making a call through the SIP server 140, the user's status can be shown as busy on the user's administrator's phone, or any device that has the permission to monitor the user. In some implementations, without modifying the basic functions of a SIP server, the presence 115 server can include a cross-platform presence adaptor that understands presence of SIP subscribers and other types of devices in the example system 100. In some implementations, a platform API 150 can be used in conjunction with the presence adaptor to translate presence information across platforms. The platform API 150 can also be in direct communication with the BLF monitor 135. In some implementations, the BLF monitor 135 can monitor subscriber status updates directly from the platform API 150.

Mobile devices such as a cell phone 175, smartphone 185, mobile computer, tablet, etc. can be communicably coupled to the soft switch 110 through the network 130, such that the presence server 115 can be aware of the location of the mobile devices and status of applications on the mobile devices. For example, when a user is away from his desk phones 160, 170, his location can be determined by the location of his mobile device, using the GPS, IP address, or WiFi network locations of the mobile device, and the user's status can be determined to be "away from desk." In another example, when the user is at home, as determined by the location of his mobile device, the user's status can be determined to be "home" or "do not disturb." In some implementations, the mobile device can be communicably coupled to the soft switch 110 through the network 130 using a mobile application installed on the mobile device that shares information about the location and usage of the mobile device.

Although call statuses are described in the above description, the cross-platform presence can be determined based on types of services, or any form of presence/status information that can be communicated through the network 130. For example, that status associated with online chatting applications, online calendar applications, and/or social network status used by a user may be reported to or pulled by the presence server 115 for the determination of the user's cross-platform presence. As for another example, when a user is joining a web based conference or having a calendar appointment, the corresponding statuses may be automatically or selectively reported to or pulled by the presence 115 server for the determination of the user's cross-platform presence. It will be understood that the priority of these statuses as compared to the priority of call statuses can be determined based on a set of rules stored at or accessible by the presence server 115 or customized by the service user. Furthermore, the various presence/statuses information can be uploaded/reported by the communication device users through any suitable API. In some implementations, the service user can determine which sources (e.g., communication devices, and/or services) of presence/status data to be reported. The service user can also determine which sources of presence/status data are allowed to be pulled by the presence server 115 based on using an API.

The presence server 115 and the SIP servers 140, 145 can be any servers that host one or more applications suitable for performing their respective functionalities. At a high level, a server comprises an electronic computing device operable to receive, transmit, process, store, or manage data and information associated with the example system 100. The SIP servers 140, 145 can be any computer or processing device such as, for example, a blade server, general-purpose personal computer (PC), Macintosh, workstation, UNIX-based workstation, or any other suitable device. Further, illustrated servers can be adapted to execute any operating system, including Linux, UNIX, Windows, Mac OS, or any other suitable operating system. According to one embodiment, servers can also include or be communicably coupled with a mail server.

The network 130 can be all or a portion of an enterprise or secured network, while in another instance, at least a portion of the network 130 can represent a connection to the Internet. In some implementations, a portion of the network 130 can be a virtual private network (VPN). Further, all or a portion of the network 130 can comprise either a wireline or wireless link. Example wireless links can include 802.11a/b/g/n, 802.20, WiMAX®, Bluetooth® and/or any other appropriate wireless link. In other words, the network 130 encompasses any internal or external network, networks, sub-network, or combination thereof operable to facilitate communications between various computing components inside and outside the illustrated environment. The network 130 can communicate, for example, Internet Protocol (IP) packets, Frame Relay frames, Asynchronous Transfer Mode (ATM) cells, voice, video, data, and other suitable information between network addresses. The network 130 can also include one or more local area networks (LANs), radio access networks (RANs), metropolitan area networks (MANs), wide area networks (WANs), all or a portion of the Internet, and/or any other communication system or systems at one or more locations.

The communications between the components of the system 100 as illustrated in FIG. 1 are generally bidirectional. For example, not only the communication devices can report/upload status information to the presence server 115, they can also retrieve/download status information from the presence server 115, or the presence server can push/feed status information to the communication devices.

While FIG. 1 is described as containing or being associated with a plurality of elements, not all elements illustrated within example system 100 of FIG. 1 can be utilized in each alternative implementation of the present disclosure. Additionally, one or more of the elements described herein can be located external to example system 100, while in other instances, certain elements can be included within or as a portion of one or more of the other described elements, as well as other elements not described in the illustrated implementation. Further, certain elements illustrated in FIG. 1 can be combined with other components, as well as used for alternative or additional purposes, in addition to those purposes described herein.

Figure 2B:
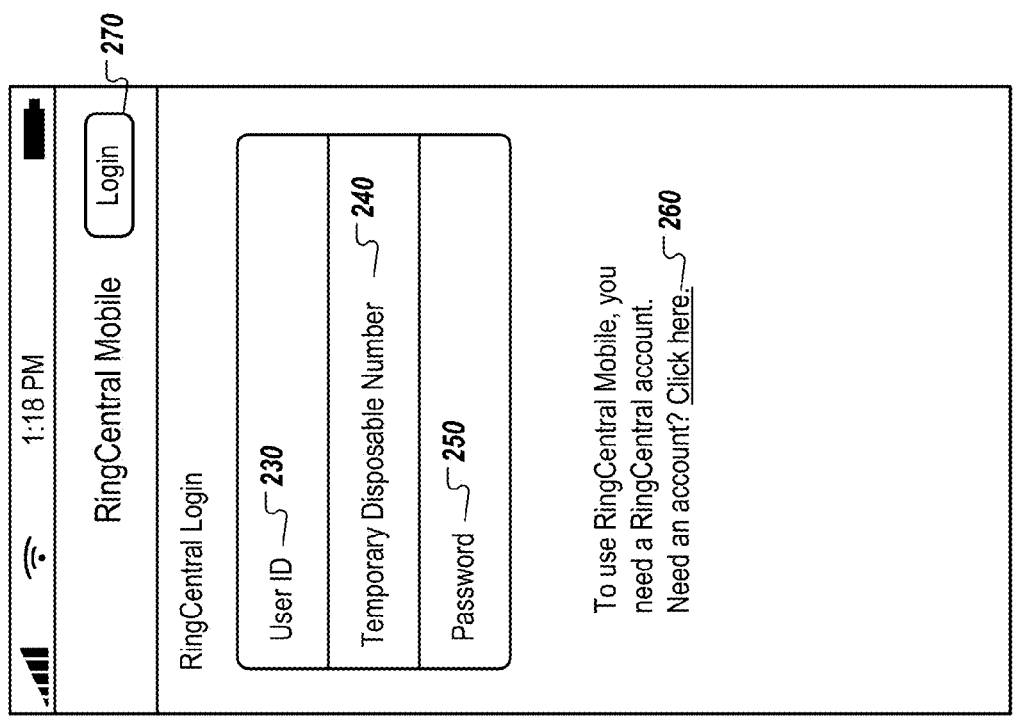
FIG. 2B shows an example user interface associated with a log in to a cross-platform presence application.
Figure 2A:
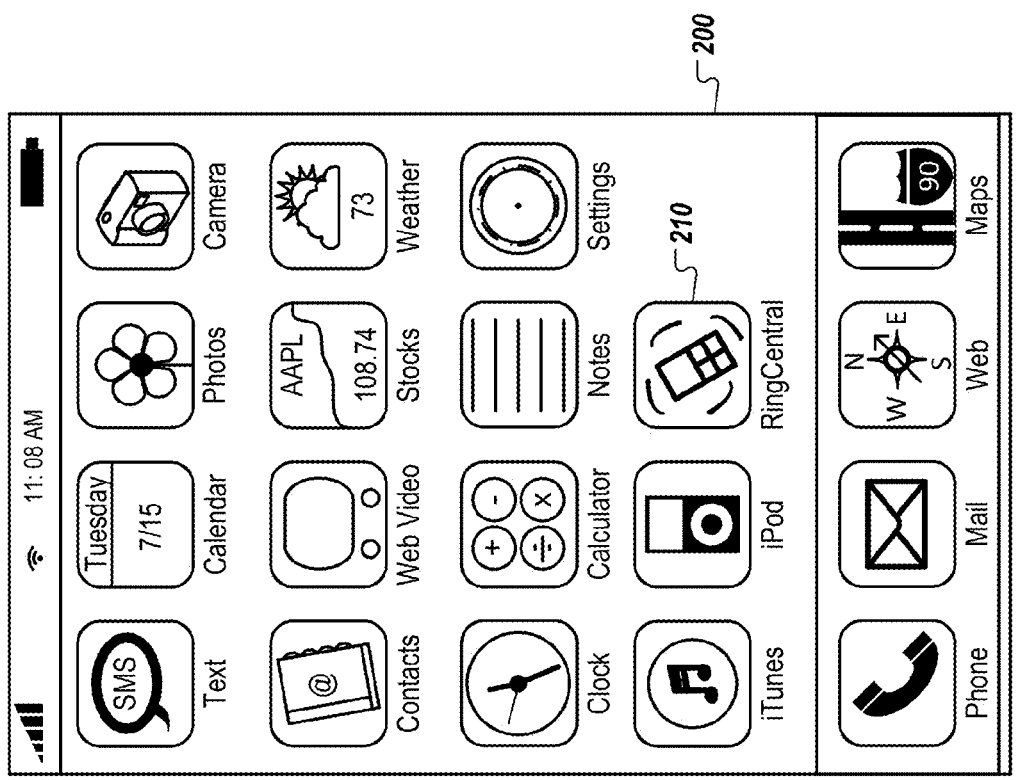
FIG. 2A shows an example user interface 200 that includes a cross-platform presence application executed on a mobile device.

FIG. 2A shows an example user interface 200 executing a cross-platform presence application on a mobile device. The mobile device can be a cellular phone 175, a softphone 180, or a smartphone 185 as describe with respect to FIG. 1. Referring to FIG. 2A, the RingCentral application 210 represents a mobile application compatible with a system that can provide cross-platform presence of users within the system (e.g., the example system 100 described with respect to FIG. 1). The RingCentral application 210 can be used by the mobile user to visually monitor cross-platform presences of other users. The application can be invoked by a user input selecting the RingCentral icon with a pointing device or touching it on the touch sensitive screen of the mobile device. The application 210 can be configured to run as a default program and can be activated whenever the mobile device is first turned on. If desired, one or more functions of the application 210 can be implemented as separate modules that each has its respective icon and can be invoked separately. For example, the activation and configuration functions can be implemented as a separate module from the telephone/voicemail module. Once the application 210 is invoked, a user interface can be presented offering a user the option to use or configure an existing user account, or to activate and configure a new subscriber account.

FIG. 2B shows an example user interface for logging into a cross-platform presence application. To log into an existing user account, a user can enter a user identifier 230 and corresponding authentication password in the password field 250.

Optionally, the user can enter a temporary disposable number 240 in place of or in addition to the identifier 230 to access the user account. After completing the identifier and password information in the appropriate fields, the user can proceed to log into the account by selecting the login button 270 on the user interface 220. In some implementations, the user can set up the application to remember the identifier and password, and automatically populate the requisite fields when the user invokes the application. An option to create a new account also can be presented as a button or a link 260 that invokes a different user interface where a user can enter requisite information to create and activate a new account.

Figure 3B:
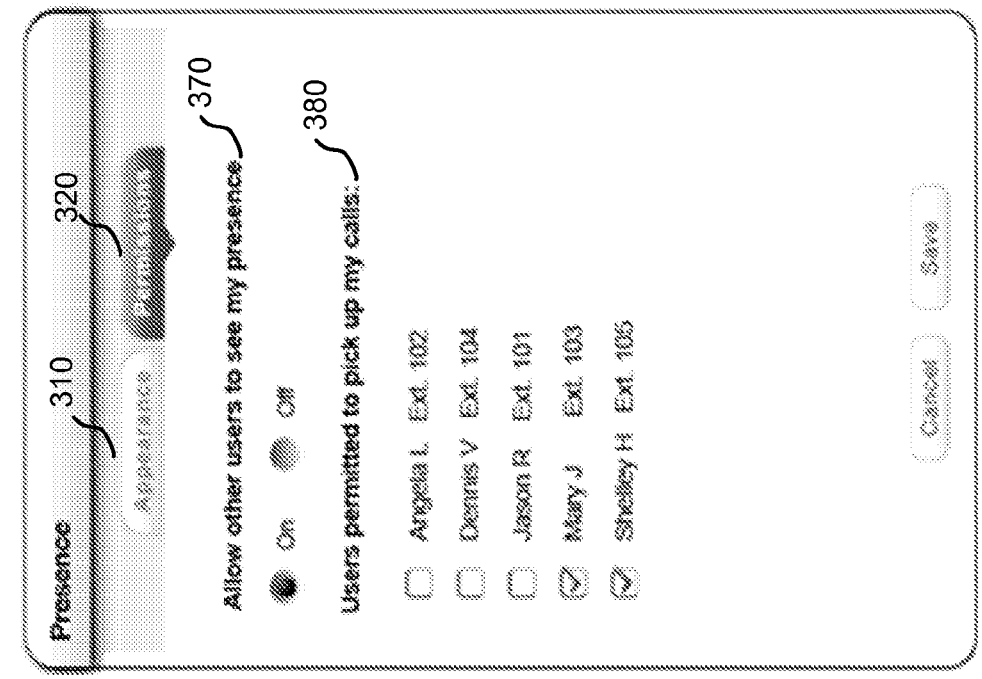
FIG. 3B shows an example user interface of a cross-platform presence application for showing user permissions.
Figure 3A:
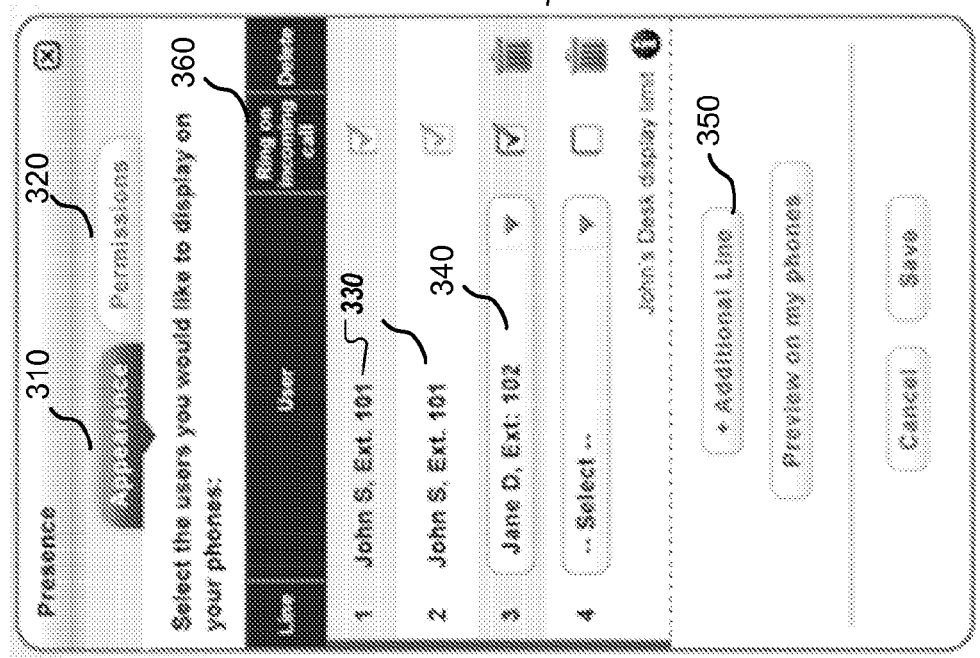
FIG. 3A shows an example user interface of a cross-platform presence application for showing user appearances.

FIG. 3A shows an example user interface 300 associated with the cross-platform presence application for showing user appearances. The example cross-platform presence application can be the RingCentral application 210 described with respect to FIG. 2A. The user interface 300 can include, for example, an appearance tab 310 and a permissions tab 320. The appearance tab 310 can be the default tab when the RingCentral application 210 is opened. A mobile device user can select the users in the RingCentral system that the user wants to monitor. In the example user interface 300, two lines of John S. 330, and one line of Jane D. 340 are monitored by the mobile user. The mobile user can also click the "+Additional Line" button 350 to add extra lines to monitor. A new line can be added to the user interface 300 after a permission to monitor is granted to the user. In some implementations, only users who have call pick-up permissions can enable the "Ring on incoming call" 360 option.

FIG. 3B shows an example user interface associated with the cross-platform presence application that allows a user to grant user permissions to other users. As shown, the user can select, on the user interface, whether to allow other users to view the user's presence 370. The default value of this option can be "On." Similarly, no users are checked by default under the "Users permitted to pick up my calls" option 380. The user extension list under the "Users permitted to pick up my calls" option can include users on the user account whose statuses are permitted to be monitored by the mobile device user. If a permission to pick up a user's call is revoked from a user extension (e.g., by unchecking the box to the left of the user extension), and the corresponding user has "Ring on incoming call" option 360 enabled, the ring on incoming call function of the associated user extension can be automatically disabled.

It will be understood that although allowing other users to see my presence 370 is shown to be an "On" and "Off" choice in this example, in some implementations, a cross-platform presence application may include a list of service users such that the application user can select which service users to share his/her status with. For the service users who the application user does not share his/her presence with, the application user may not be shown on their communication devices or may be shown as "unavailable."

Figure 4B:
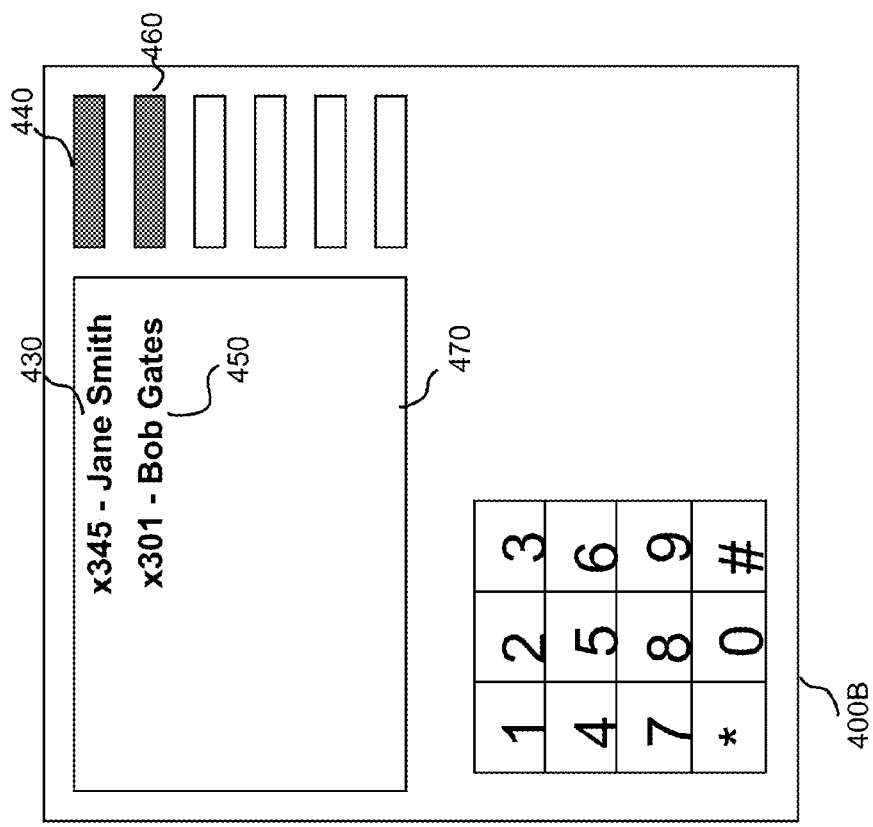
FIG. 4B shows another example user interface for presenting another presence state.
Figure 4A:
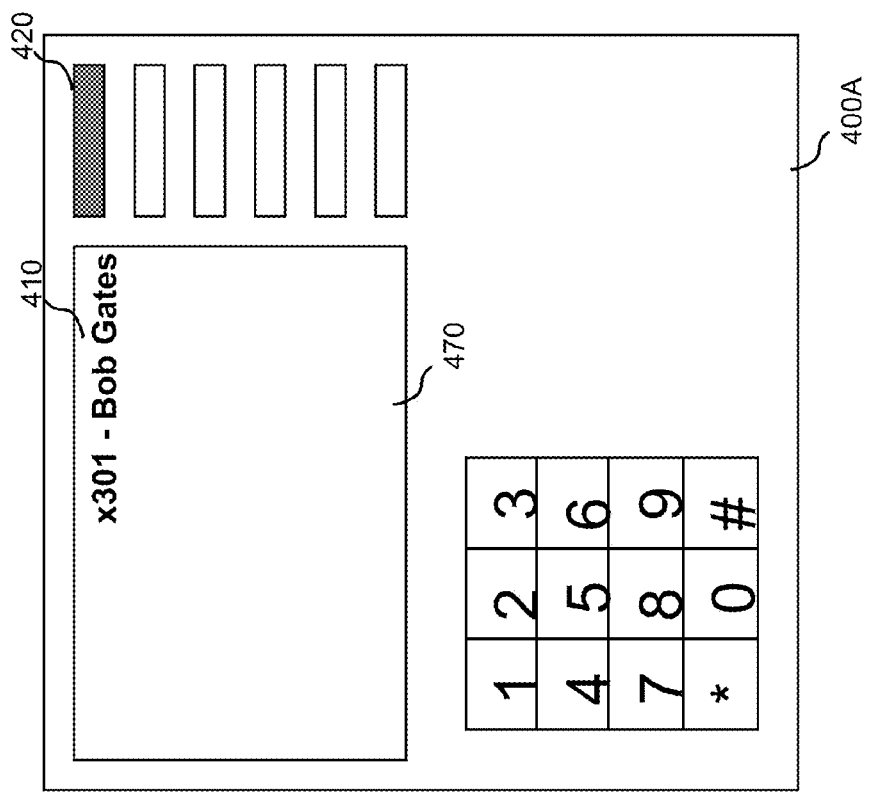
FIG. 4A shows an example user interface for presenting a presence state.

FIG. 4A shows an example user interface 400A for presenting an example presence state. The user interface 400A can be the user interface of a desk phone (such as the desk phone 160 or 170 described with respect to FIG. 1) used by a business manager, Bob Gates. The user identification (ID) 410 of Bob gates (i.e., name and extension) is shown on a display 470 of the desk phone. The user interface 400A also includes a BLF 420 that corresponds to the user ID 410. In some implementations, the BLF 420 can include a light-emitting diode (LED) that can indicate the presence of the corresponding user based on different colors and/or blinking rates. In the example shown in FIG. 4A, the BLF 420 can show indications of the user's own presence. For example, no light on the BLF 420 can indicate that Bob is available, red light can indicate that Bob is busy (e.g., Bob is talking on his cellular phone), purple light can indicate that Bob is at home, blinking green can indicate that Bob has an incoming call, blinking purple can indicate that Bob has a call on hold, yellow can indicate that Bob is away from his desk but available on a mobile device, and blinking yellow can indicate that Bob is traveling in vehicle but available on a mobile device. The colors and blinking patterns on the BLF 420 can vary by phone models. In some implementations, a user's presence state can be indicated on a phone or computer display by name of presence state rather than by light indicator, such as "busy," "do not disturb," "away from desk," "at home," "unavailable," etc.

FIG. 4B shows another example user interface 400B for presenting another example presence state. The user interface 400B can be the user interface of a desk phone (such as the desk phone 160 or 170 described with respect to FIG. 1) used by a business administrator, Jane Smith. The user ID of Jane (e.g., name and extension) 430 and the user ID of the manager Bob Gates 450 is shown on a display 470 of the desk phone. The user interface 400B can also include a BLF 440 that corresponds to Jane's user ID 430, and a BLF 460 that corresponds to Bob's user ID 410. Similar to the BLF 420 described with respect to FIG. 4A, each of the BLFs 440 and 460 can include an LED that can indicate the presence of the corresponding user based on different colors and/or blinking rates. In the example shown in FIG. 4A, the BLF 420 can show indications of the user's own presence. For example, no light on the BLF 420 can indicate that Bob is available; a red light can indicate that Bob is busy (e.g., Bob is talking on a cellular phone); a blinking green light can indicate that Bob has an incoming call; and a blinking yellow light can indicate that Bob has a call on hold. The colors and blinking patterns on the BLF 420 can vary by phone models. Based on Bob's presence as indicated by the BLF 460, Jane can transfer calls and answer calls on Bob's behalf in order to increase Bob's productivity.

Although the presences of two users are shown in the example user interface 400B, the presences of any number of users can be accommodated by a user interface. For example, for a desk phone, a sidecar can be added to expand the display of the user interface to accommodate more user presences. For a smartphone or a softphone, a list of user presences can be shown by the corresponding application on more than one tab/page. Furthermore, it will be understood that the presence of a user may be displayed in various ways based on the capability of the communication devices. For example, a softphone may use text, icons, animations, or voices to indicate a user's presence. In some implementations, more sophisticated communication devices can show a presence history of a user in addition to the current status of a user.

Figure 5:
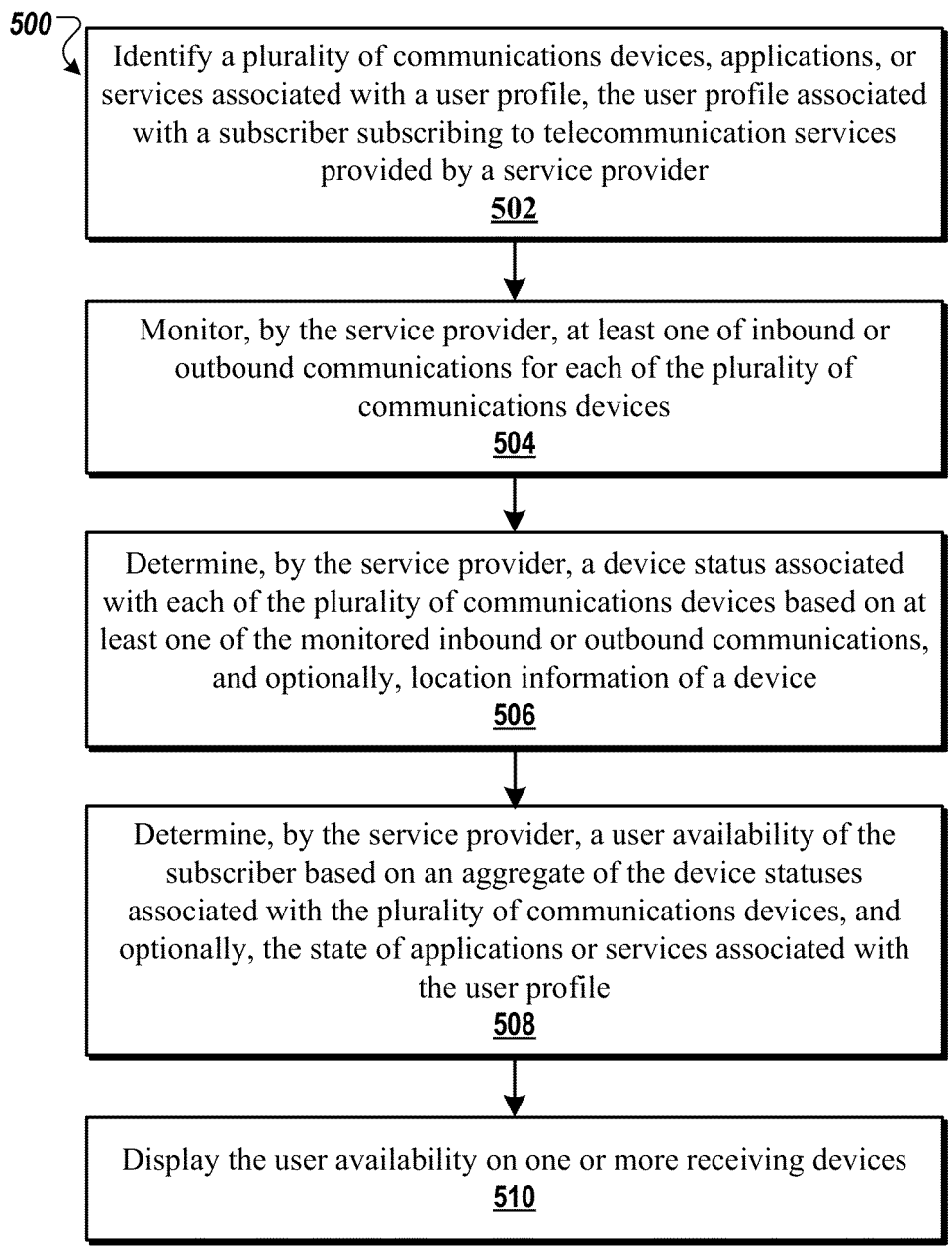
FIG. 5 is a block diagram of a processing device that can be used to execute methods and processes disclosed herein.

FIG. 5 shows a flow chart of an example process 500 for determining cross-platform presence. The operations described in process 500 are not to be construed as necessarily requiring their performance in the particular order discussed or illustrated, unless specifically identified as an order of performance. It is also to be understood that additional or alternative operations may be employed.

At 502, a plurality of communication devices, applications, or services associated with a user profile can be identified. The user profile can be associated with a subscriber subscribing to telecommunication services provided by a service provider.

At 504, inbound and outbound communications for each of the plurality of communication devices are monitored.

At 506, a device status associated with each of the plurality of communication devices are determined based on the monitored inbound and outbound communications, and optionally, location information of a device.

At 508, a user availability of the subscriber is determined based on an aggregate of the device statuses associated with the plurality of communication devices, and optionally, the state of applications or services associated with the user profile.

At 510, the user availability is displayed on one or more receiving devices.

Generic Computing System

Figure 6:
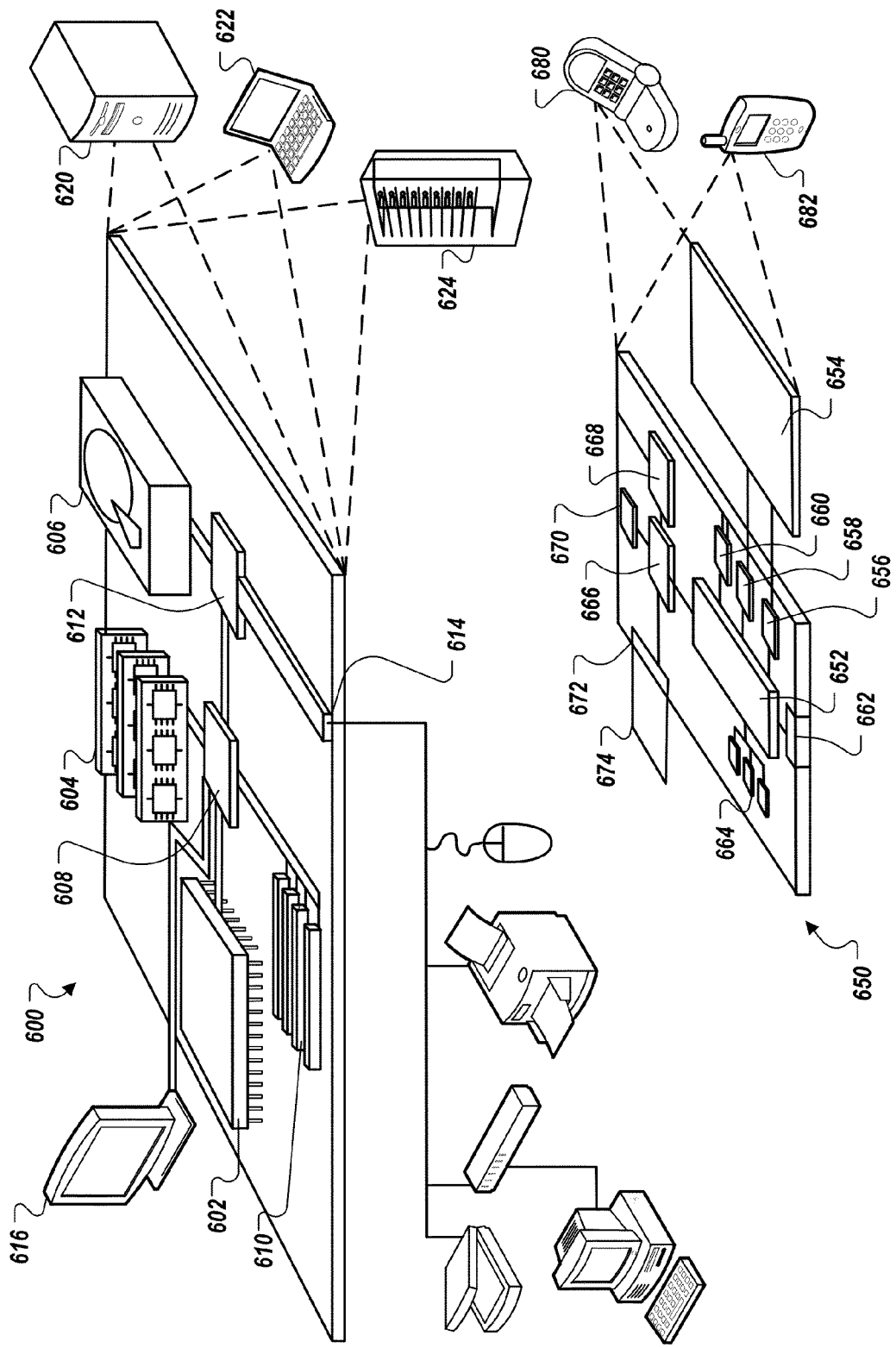
FIG. 6 is a block diagram of a generic computing system that can be used to implement methods and processes disclosed herein.

FIG. 6 is a block diagram of computing devices 600, 650 that may be used to implement the systems and methods described in this document, as either a calling device or receiving device. Computing device 600 can represent various forms of digital computers, such as laptops, desktops, workstations, personal digital assistants, servers, blade servers, mainframes, and other appropriate computers (e.g., user terminal 66). Computing device 650 can represent various forms of mobile devices, such as personal digital assistants, cellular telephones, smartphones, and other similar computing devices used to place or receive the calls. The components shown here, their connections and relationships, and their functions, are meant to be exemplary only, and are not meant to limit implementations of the inventions described and/or claimed in this document.

As shown in FIG. 6, computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The features described can be implemented in digital electronic circuitry, or in computer hardware, firmware, software, or in combinations of them. In some implementations, the apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. In other implementations, the apparatus can be implemented in a computer program product tangibly embodied in an information carrier for execution by a programmable processor. In some implementations, the information carrier can include a propagated signal.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what can be claimed, but rather as descriptions of features that can be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations.

A number of embodiments of the invention have been described. Nevertheless, it will be understood that various modifications can be made without departing from the spirit and scope of the invention. Accordingly, other embodiments are within the scope of the following claims.

What is claimed is:

1. A method comprising:
identifying a plurality of communication devices associated with a user profile, the user profile associated with a subscriber subscribing to telecommunication services provided by a service provider;
monitoring, by the service provider, at least one of inbound or outbound communications for each of the plurality of communication devices;
determining, by the service provider, a device status associated with each of the plurality of communication devices based on the at least one of monitored inbound or outbound communications;
determining, by the service provider, a user availability of the subscriber based on an aggregate of the device statuses associated with the plurality of communication devices, wherein determining the user availability comprises:
determining that a first device status associated with a first device of the plurality of devices indicates that the subscriber is not available to receive communications at the first device,
determining, based at least in part on the first device status, that the subscriber is not available to receive communications on the plurality of communications devices even if a second device status associated with a second communications device of the plurality of devices indicates that the subscriber is available to receive communications at the second device, and
setting the user availability to a state that indicates that the subscriber is not available to receive communications; and
displaying the user availability on one or more receiving devices.

2. The method of claim 1, further comprising receiving information identifying priorities associated with the device statuses,
where determining the user availability is performed based on the aggregate of the device statuses and the identified priorities associated with the device statuses.

3. The method of claim 2, further comprising receiving information relating to one or more characteristics associated with a call to or from the plurality of communication devices, wherein determining the user availability is performed based on the aggregate of the device statuses and at least one of the identified priorities associated with the device statuses or the one or more characteristics associated with the call.

4. The method of claim 1, further comprising receiving user input specifying priorities associated with the plurality of communication devices,
wherein determining the user availability is performed based on the aggregate of the device statuses and the specified priorities associated with the plurality of communication devices.

5. The method of claim 1, further comprising identifying the status of a communication device as unavailable when a communication is forwarded to or from the communication device.

6. The method of claim 1, further comprising transferring an incoming communication to the receiving device based on the displayed user availability.

7. The method of claim 1, wherein displaying the user availability includes displaying the user availability on a plurality of receiving devices from which inbound communications or to which outbound communications are made.

8. The method of claim 1, wherein identifying the plurality of communication devices includes identifying the plurality of communication devices associated with a first user profile.

9. The method of claim 1, further comprising retrieving the user profile that identifies the one or more receiving devices on which the user availability is displayed.

10. The method of claim 1, further comprising:
displaying a plurality of users in the user profile; and
receiving a selection of one or more of the plurality of users who are permitted to pick up calls made to the subscriber.

11. The method of claim 1, further comprising updating the status to a first state when an inbound communication has arrived or an outbound communication initiated at one of the plurality of communication devices has been placed but not yet answered.

12. The method of claim 11, further comprising updating the status to a second state when an inbound communication has been connected to or an outbound communication connected from one of the plurality of communication devices, or when a call on hold is no longer on hold.

13. The method of claim 12, further comprising updating the status to a third state when an active communication on one of the plurality of communication devices has been placed on hold.

14. The method of claim 1, further comprising determining, by the service provider, a device status associated with at least one of the plurality of communication devices based on a geographical location associated with at least one of the plurality of communication devices.

15. The method of claim 1, further comprising determining, by the service provider, a user availability of the subscriber based on a state of at least one of social media-related applications or scheduling applications associated with the subscriber.

16. The method of claim 1, further comprising:
receiving a request from a caller for additional user availability information in response to the displayed user availability; and
transmitting the additional user availability information to the call based on the request.

17. A system comprising:
a server in communication with a plurality of communication devices associated with a subscriber subscribing to telecommunication services operable to:
monitor inbound and outbound communications for each of the plurality of communication devices associated with the subscriber;
determine a device status associated with each of the plurality of communication devices based on the monitored inbound and outbound communications; and
determine a user availability of the subscriber based on an aggregate of the device statuses associated with the plurality of communication devices, wherein determining the user availability comprises:
determining that a first device status associated with a first device of the plurality of devices indicates that the subscriber is not available to receive communications at the first device,
determining, based at least in part on the first device status, that the subscriber is not available to receive communications on the plurality of communications devices even if a second device status associated with a second communications device of the plurality of devices indicates that the subscriber is available to receive communications at the second device, and setting the user availability to a state that indicates that the subscriber is not available to receive communications.

18. The system of claim 17, wherein the device includes circuitry to transmit information associated with the user availability to one or more receiving devices for display.

19. A device comprising:

a status engine in communication with a plurality of first communication devices associated with a first user to determine a device status associated with each of the plurality of first communication devices based on at least one of inbound communications to or outbound communications from the plurality of first communication devices; and a first indicator to indicate an availability status associated with the first user, the availability status of the first user determined based on an aggregate of the device statuses associated with the plurality of first communication devices, wherein determining the user availability comprises:

determining that a first device status associated with a first device of the plurality of devices indicates that the subscriber is not available to receive communications at the first device, determining, based at least in part on the first device status, that the subscriber is not available to receive communications on the plurality of communications devices even if a second device status associated with a second communications device of the plurality of devices indicates that the subscriber is available to receive communications at the second device, and setting the user availability to a state that indicates that the subscriber is not available to receive communications.

20. The device of claim 19, wherein the status engine is in communication with a plurality of second communication devices associated with a second user to determine a device status associated with each of the plurality of second communication devices based on at least one of inbound communications to or outbound communications from the plurality of second communication devices, the device further comprising:

a second indicator to indicate an availability status associated with the second user, the availability status of the second user determined based on an aggregate of the device statuses associated with the plurality of second communication devices.

\* \* \* \* \*